June 17, 1930.   F. G. DIAGO   1,765,214
AMPHIBIAN AIRPLANE
Filed June 3, 1927   11 Sheets-Sheet 1

June 17, 1930.  F. G. DIAGO  1,765,214
AMPHIBIAN AIRPLANE
Filed June 3, 1927   11 Sheets-Sheet 4

INVENTOR
F. G. Diago
BY
ATTORNEYS

June 17, 1930.  F. G. DIAGO  1,765,214
AMPHIBIAN AIRPLANE
Filed June 3, 1927   11 Sheets-Sheet 10

WITNESS

INVENTOR
F. G. Diago,
BY
ATTORNEYS

June 17, 1930.          F. G. DIAGO                1,765,214
                    AMPHIBIAN AIRPLANE
                    Filed June 3, 1927          11 Sheets-Sheet 11

INVENTOR
F. G. Diago,
BY
ATTORNEYS

Patented June 17, 1930

1,765,214

UNITED STATES PATENT OFFICE

FEDERICO GUILLERMO DIAGO, OF HABANA, CUBA

AMPHIBIAN AIRPLANE

Application filed June 3, 1927. Serial No. 196,281.

This invention relates to improvements in aircraft, particularly aircraft of the heavier than air type and which consists of the constructions, combinations and arrangements herein described and claimed.

An object of the invention is to provide an airplane having provision for alighting upon water, ice fields, level or otherwise, desert sands, land, et cetera, the facility with which these provisions may be used being attributable to stabilizing apparatus which can be made to function in such a manner as to greatly retard the descent of the airplane in the event of an emergency and when the need arises.

Another object of the invention is the provision of an improved stabilizing apparatus for air craft which, although capable of considerable modification so far as its particular form is concerned, is generally for the purpose of so disposing the sustaining surface or surfaces in respect to the fuselage as to considerably retard the descent of the air craft in case of an engine failure or of a desire on the part of the pilot to alight in a particular place.

Other objects and advantages appear in the following specification, reference being had to the accompanying drawings, in which:—

The rapidly increasing use of aircraft of various kinds, especially of the heavier than air type, is developing the problem of effective landing arrangements not only as relates to suitable places on the earth surface but also to appropriate mechanism on the aircraft itself for effecting the landing in the serious contingency of a stopping of the engine. A landing may be either forced, as when engine trouble develops, or voluntary as when the pilot wishes to descend.

It is commonly known that proper landing fields are few and far between. This circumstance involves no hardship when the pilot has reached his destination and can accurately gauge his landing, but the problem presented by a forced landing is entirely different and of a very serious aspect.

In the latter case it would be very desirable to allow the aircraft to gravitate directly to the earth surface at the time of the occurrence of engine or other trouble, but the nearest known approach to this desirable facility is the parachute. This extremely useful device is strapped on the back of the person in an expertly folded condition, and is designed to open by wind pressure when the person leaps from the aircraft. Without elaborating upon either the merits or demerits of the parachute and upon other facts and circumstances attending the operation and management of aircraft the description of the invention may be introduced by the statement that it is herein proposed to so equip an airplane that it becomes readily possible for the airplane to gravitate to the earth surface with greatly retarded speed at any place, desirable or otherwise, as conditions may dictate.

Although the idea is disclosed by means of a number of modifications, the general principle prevails in all and attention is first directed to Figs. 1 to 8 in which the main plane itself is made to operate as the retarding element.

The fuselage 1 carries a turret 2 which is surmounted by the main plane 3 and normally locked in position by means of a plurality of bolts 4 and keepers 5. The keepers are carried by the main plane but the bolts are carried by a short shaft 6 suitably journaled upon a bracket 7 conveniently attached to the turret, reference being had to Figs. 5 and 6 for the details. The bolts are nothing more than arms radiating from what may be called a hub 8 on the shaft 6, a turning of these parts either engaging or disengaging the bolts from the keepers so that the main plane is either held or freed.

Figure 1:
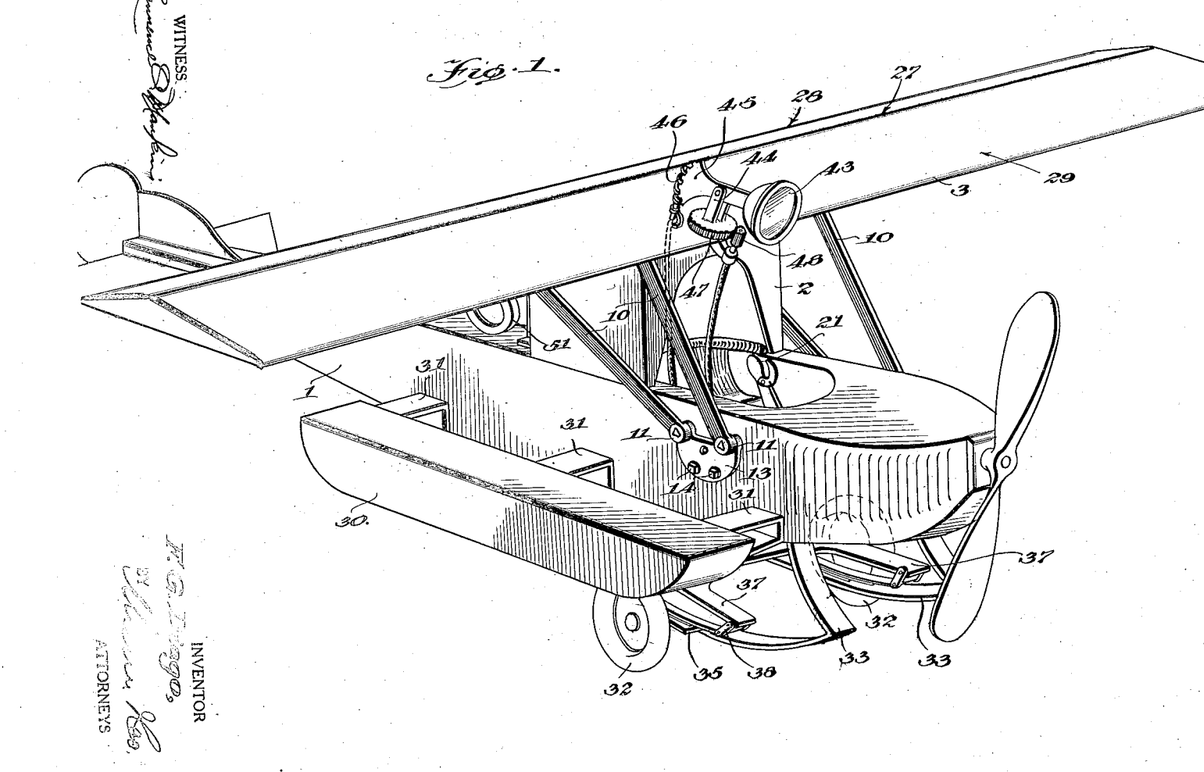
Figure 1 is a perspective view of the improved airplane illustrating the general arrangement of one of the improvements in the stabilizing apparatus.
Figures 2, 3, 4:
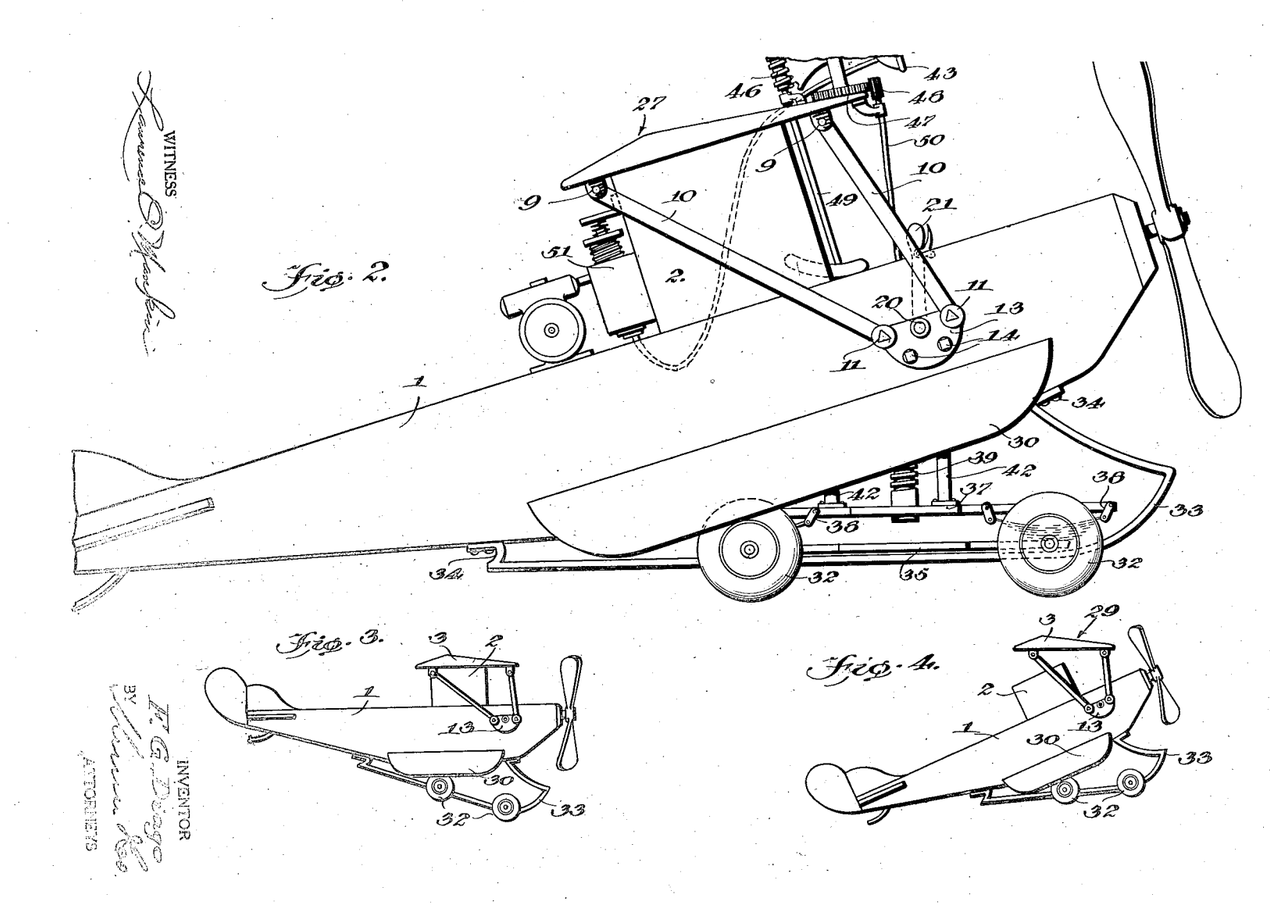
Figure 2 is a side elevation of the airplane.
Figure 3 is a detail diagram again illustrating the relationship of the main plane with the fuselage while in flying position.
Figure 4 is a detail diagram illustrating the shifted relationship of the main plane and fuselage when the airplane is in the act of gravitating to the earth surface.

The latter statement indicates the loose mounting of the main plane which is employed to adjust when it is desired to let the airplane down. Suitable bearings 9 on the underside of the main plane receive the suspending arms 10 which at their lower ends are mounted upon the non-circular ends 11 (Fig. 8) of suitable shafts. These are journaled in bearings 12 on plates 13 suitably affixed to the fuselage as at 14. Ordinarily the arms 10 incline rearwardly as clearly shown in Figs. 2 and 3, but when the main plane is released there is an immediate change in relative position of the main plane and fuselage, the arms 10 being swung forwardly so that the main plane is disposed as shown in Fig. 4.

Figure 5:
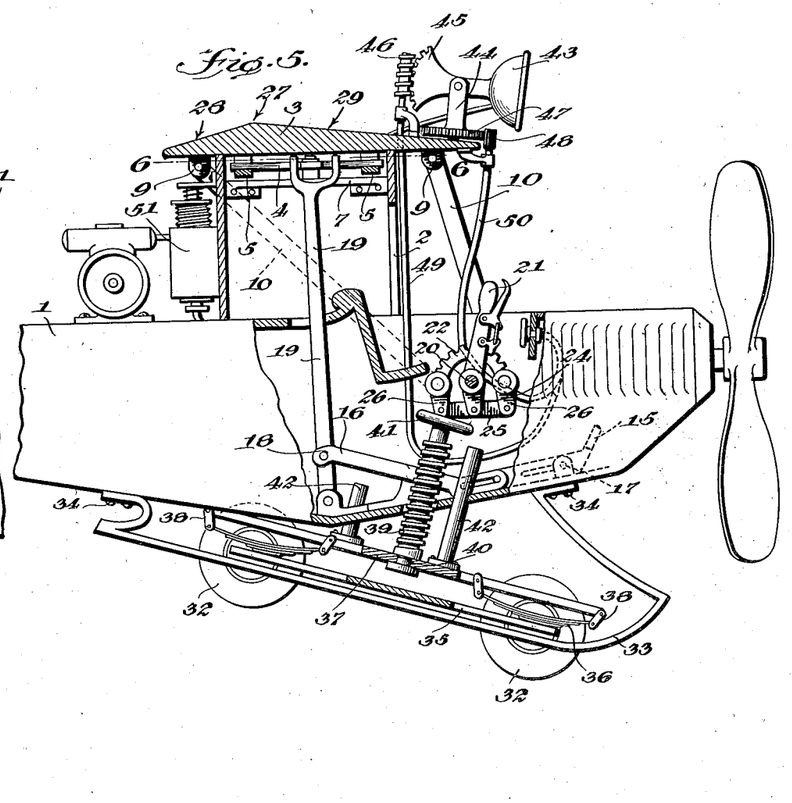
Figure 5 is a detail sectional view of the airplane.
Figure 6:
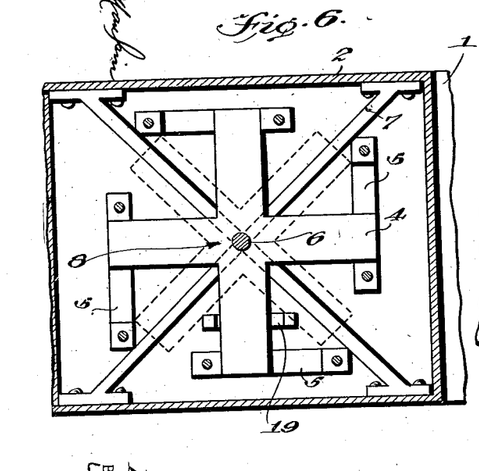
Figure 6 is a section taken substantially on the line 6—6 of Fig. 5.
Figure 7:
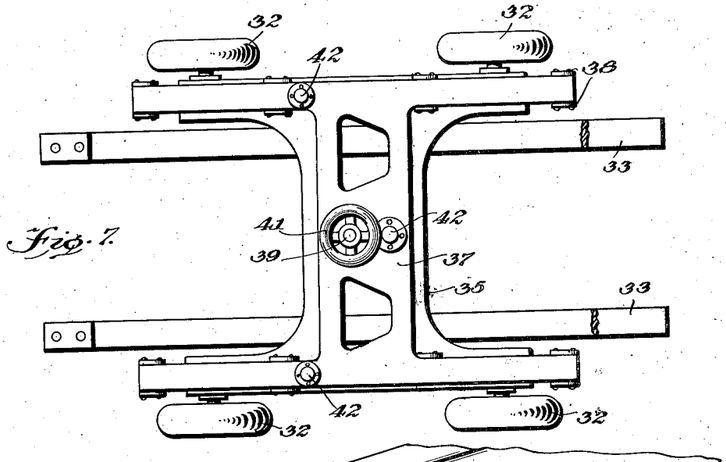
Figure 7 is a detail plan view of the landing gear, parts being shown in section.

Release of the main plane is accomplished by the application of pressure against the treadle 15 of a drag link 16 (Fig. 5). This drag link is suitably guided at 17, and at 18 is connected with the pivoted fork 19 which engages one of the foregoing bolts 4. The action is to rock the fork 19 and cause turning of the bolts 4 until the keepers 5 are disengaged and the main plane freed. The latter may then be swung forwardly off of the turret 2, and into such position wherein the surface formerly concealed by the turret is made available for aiding in the retardation of the descent of the aircraft.

The plates 13 (Fig. 8) also provide bearings for the ends of a shaft 20 which carries an operating lever 21 the positions of the lever are held by a fixed quadrant 22 and detent 23. The shaft carries crank arms 24 which connect with rings 25. The latter join other crank arms 26 upon the foregoing stub shafts, appropriate movement of the lever 21 being accomplished by a concerted action of the various crank arms, rings and suspending arms 10 so that the main plane 2 is either swung forwardly or backwardly to arrive at the position shown either in Fig. 4 or Fig. 3.

It is observed that the main plane 3 is formed with a ridge 27 providing a double pitch as at 28 and 29. The purpose of these provisions is to facilitate the shedding of rain, hail and the like, and although the use of a double pitch as shown and described, it is anticipated that the plane may be made with but a single pitch and retain advantages believed to be inherent in the adopted construction.

One of the intended uses of the airplane is that of cross-ocean flight, the hazards of which are uncommonly great. These are relieved in a large measure by the provision of floats or pontoons 30 which are rigidly attached to the sides of the fuselage 1 by means of brackets 31 or otherwise. These pontoons may properly be considered part of the landing gear which includes wheels 32 for ground landing and skids 33 for landing and locomotion of the airplane upon ice, desert sands, or the like.

The skids are permanently attached to the fuselage as at 34 but the wheels 32 are capable of being raised and lowered in respect to the skids and the fuselage so that the use of the skids may not be interfered with by the wheels and vice versa. For these purposes the wheels are carried by a yoke 35 which has attached springs 36 suspended from the landing frame 37 by means of shackles 38. A screw 39 has a suitable connection at 40 with the landing frame and has a hand wheel 41 by which the screw is turned and the landing frame raised or lowered. Rods 42 guide the landing frame in its movements.

Anticipating a wide use of the airplane, provision is made of one or more headlights 43. Only one of these is shown and described, but the construction of each will be alike. The headlight 43 is pivotally mounted upon a support 44 and has a gear segment 45 with which a worm 46 meshes. The support also has a gear segment 47 with which a pinion 48 meshes.

The worm and pinion are respectively carried by flexible shafts 49 and 50 which lead to a suitable point of control in front of the pilot. By causing turning of one or the other of the shafts the headlight may be raised, lowered or turned sidewise, whereby the beam is turned wherever desired. It is believed preferable to burn gas in the headlight and to such end an acetylene or other gas generator 51 is mounted in appropriate position upon the fuselage.

Figures 8, 11:
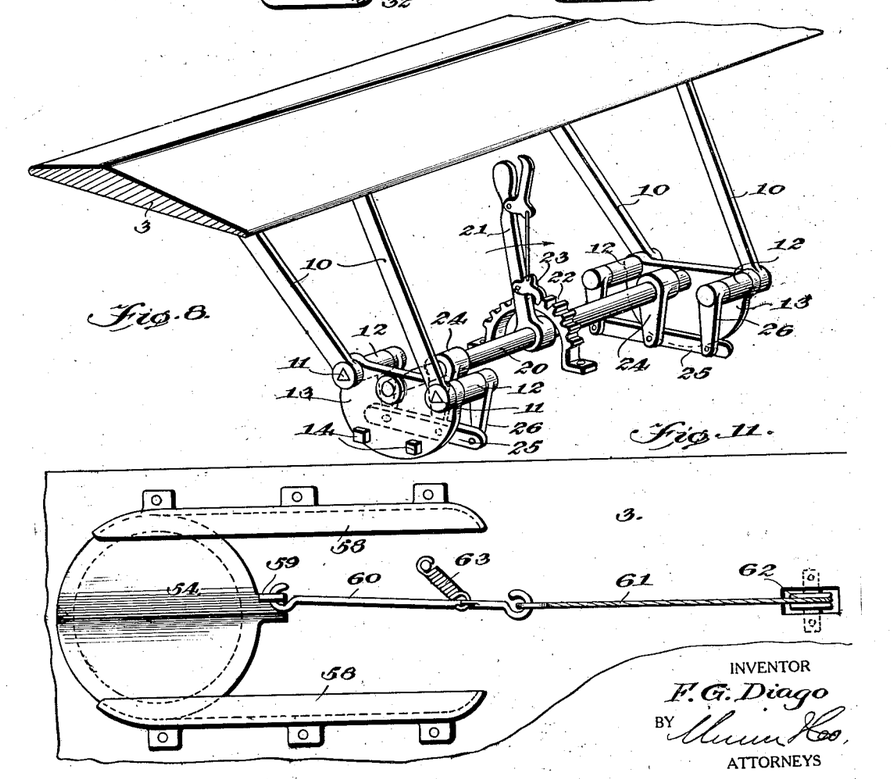
Figure 8 is a detail perspective view of the main plane hinging and operating mechanism.
Figure 11 is a detail plan view of the trap door and sliding mechanism therefor.
Figure 9:
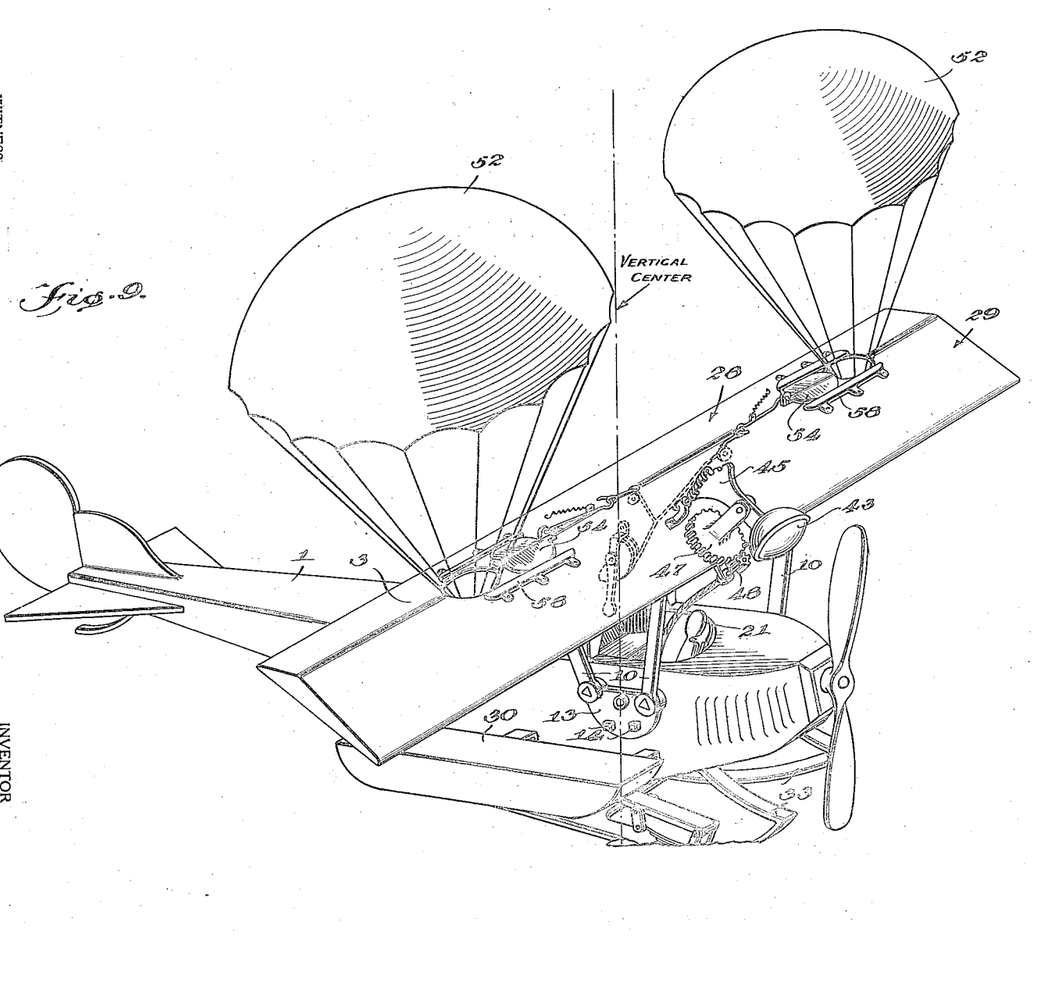
Figure 9 is a perspective view illustrating the use of parachutes in connection with the main plane for the purpose of retarding the descent of the airplane.
Figures 10, 12, 13:
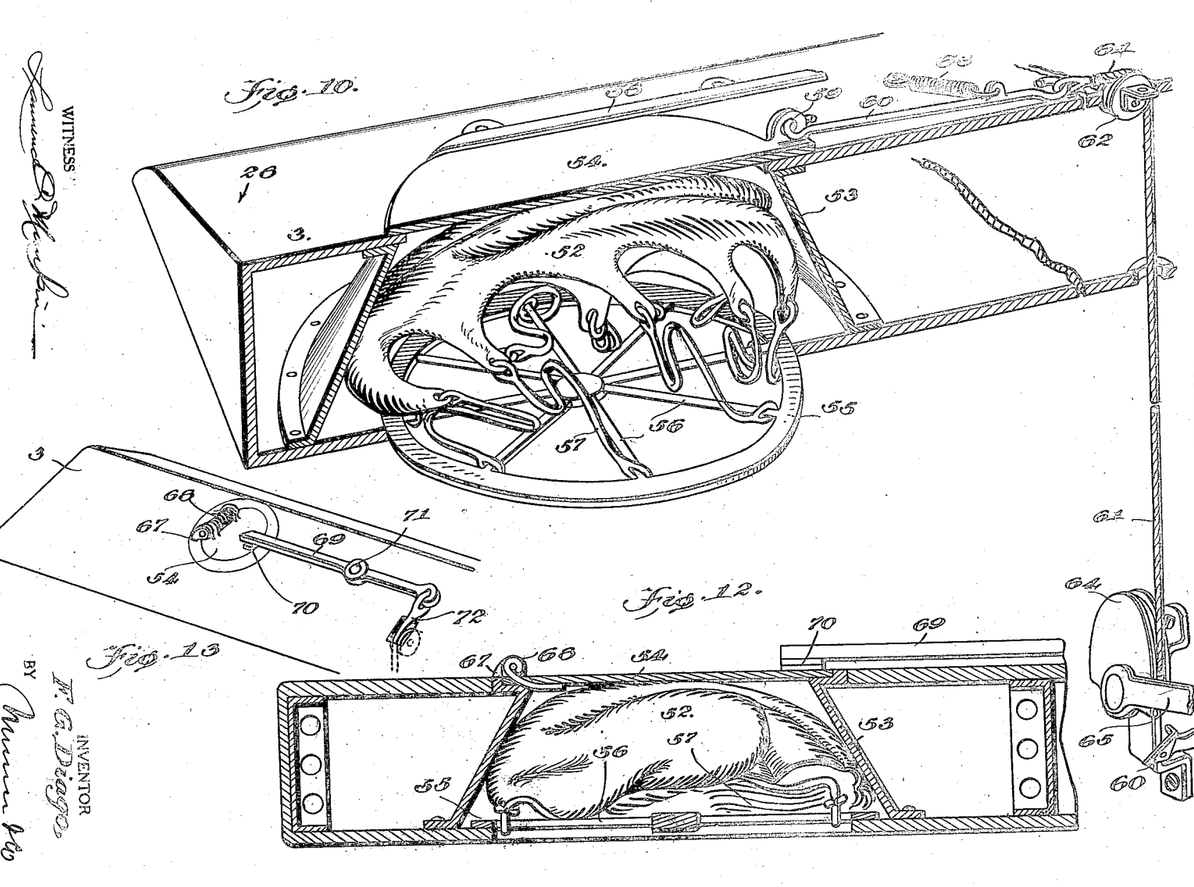
Figure 10 is a sectional perspective view of a portion of the main plane illustrating how the parachute is housed.
Figure 12 is a detail sectional view illustrating a modified form of trap door.
Figure 13 is a detail perspective view showing the release lever for the foregoing trap door.

Figs. 9, 10 and 11 illustrate a modification wherein parachutes 52 are employed for the purpose of retarding the descent of the airplane. Such parts as have already been described are herein indicated with corresponding reference numerals without a repetition of the description. Each parachute is normally contained by a housing 53 situated within the main plane 3, (Fig. 10). There is a large circular opening in the bottom of the housing or lower compartment of the main plane for the purpose of admitting the air when the trap door 54 is slid back, thus causing the discharge and opening of the parachute.

This large opening is surrounded by the rim 55 of a grating, the spokes 56 of which serve as anchorage for the cords 57 of the parachute 52. The trap door is slidable in guides 58. It has an upstanding ear 59 to which a ring 60 is connected. A cord 61, connected to the opposite end of the ring, is trained over one or more pulleys 62 and leads to a pulley segment 64 (Fig. 10) which has an operating handle 65 and a latch 66 to hold the handle down and the trap door in the open position. A spring 63 attached to the main plane and to the ring 60 serves to keep the trap door 54 normally closed.

Figures 12 and 13 illustrate modifications of the arrangement in Fig. 10 to the extent of hinging the trap door 54 as at 67, and arranging a coil spring 68 on the hinge pin 70 in such a manner as to cause opening of the trap door. A release lever 69 keeps the trap door closed and at one extremity has a resilient foot 70 in position to bear upon the trap door. The lever is pivoted at 71, and upon pulling on the cable 72, attached to the opposite end of the lever, the lever is rocked upon its pivot into disengaging position whereupon the trap door 54 flies back and the parachute is caused to be discharged by the rush of air through the housing 53.

Figure 14:
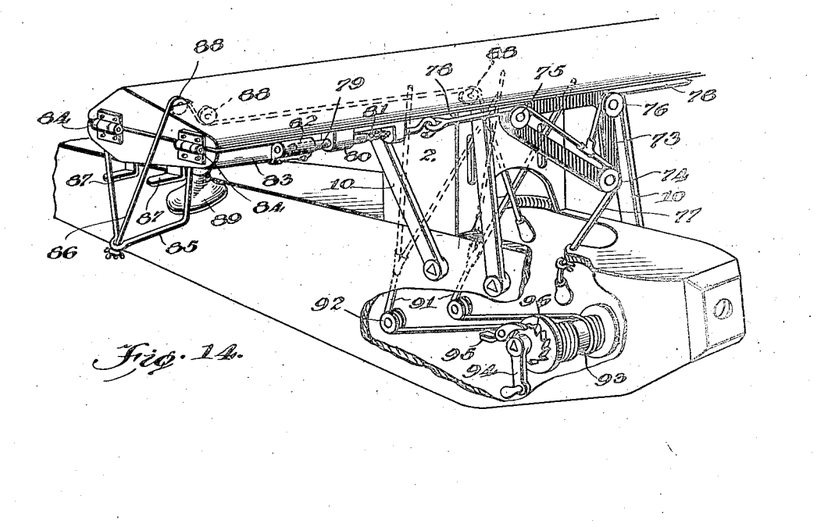
Figure 14 is a perspective view of another modification in the airplane construction which includes extensible end panels carrying propellers for retarding gravitational movement.
Figure 15:
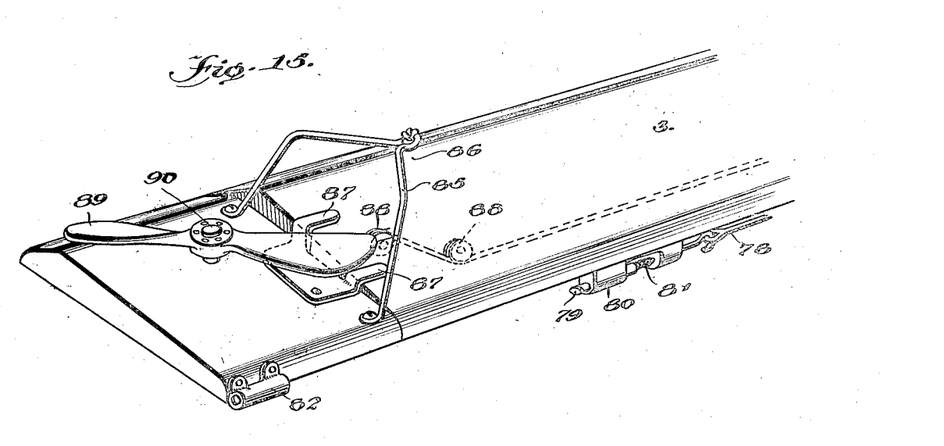
Figure 15 is a detail perspective view showing one of the end panels in the extended position.
Figure 16:
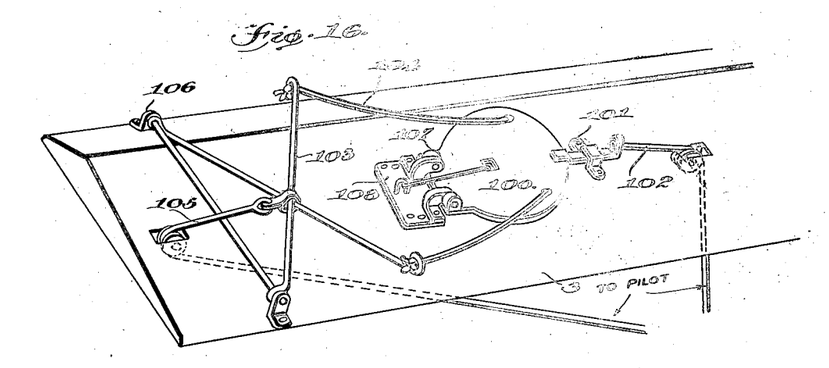
Figure 16 is a perspective view of a further modification of the airplane, illustrating another arrangement of trap door for use in connection with a modified arrangement of parachute.
Figure 17:
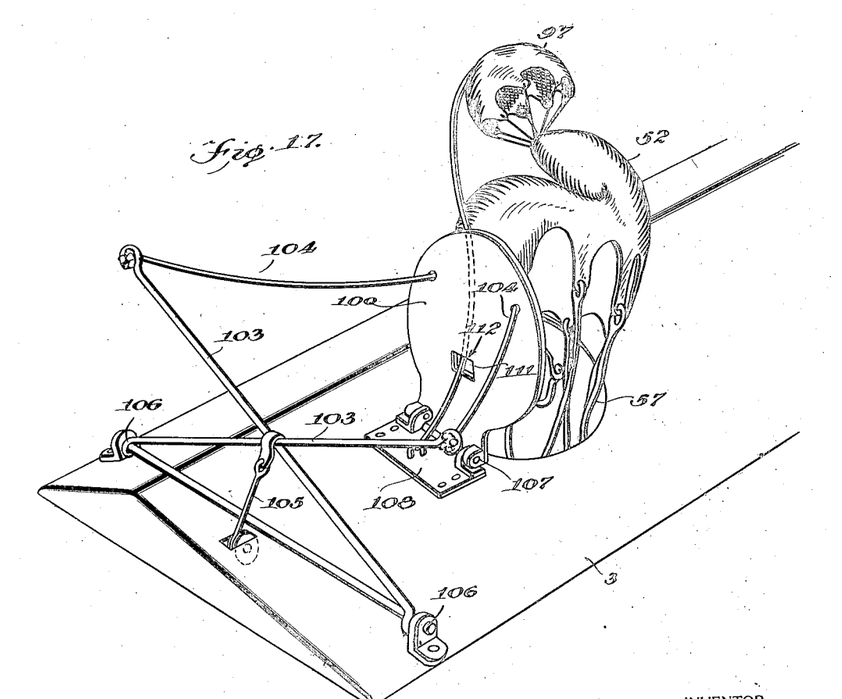
Figure 17 is a perspective view showing the foregoing modified arrangement of parachute which includes a pilot parachute which insures the discharge of the main parachute.
Figure 18:
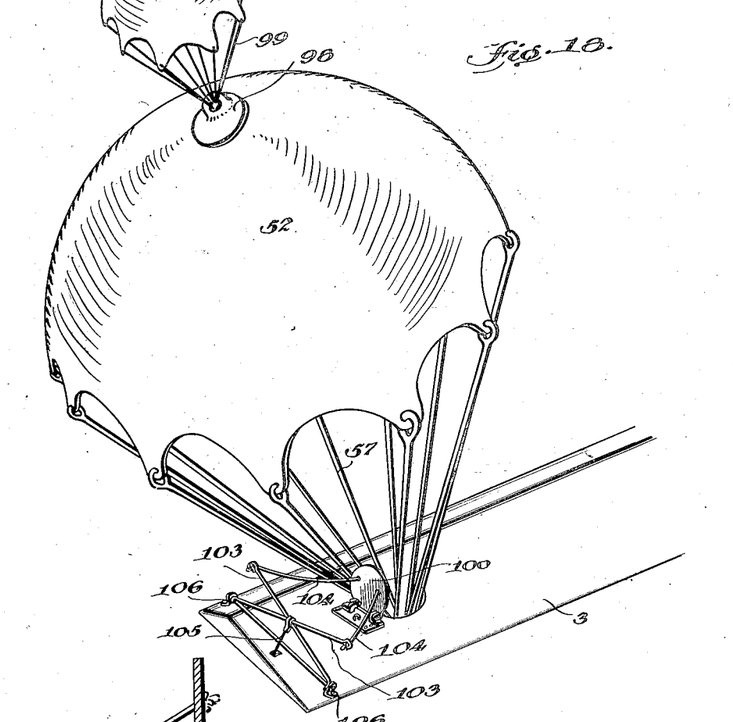
Figure 18 is a perspective view showing the foregoing main parachute in the fully open position.

Figs. 14 and 15 illustrate a modification in the mechanism for controlling the main plane 3 at its forward position in respect to the turret 2. Cables 91 are trained over pulleys 92 and attached to the main plane 3 in such a manner as to normally hold the main plane in position upon the turret, but when released will permit the main plane to move to the forward position as shown, for example, in Fig. 4. The cables are wound upon a drum 93. The drum can be turned by means of handle 94 in order to wind the cables. A pawl 95 and ratchet 96 hold the cables in wound position.

A triangular frame 73 firmly fixed to the edge of the main plane, carries pulleys 74, 75 and 76 over which the main cord 77 and branch cords 78 are trained.

The latter extend to points of connection with latches 79. Only one of these is shown in Figs. 14 and 15, but the latch at the opposite end of the main plane is of identical construction. The latch 79 slides in a guide 80 affixed to the main plane, the latch having a reduced portion providing a shoulder to bear against the spring 81, which normally keeps the latch extended, and in position to engage the keeper 82 thus to hold the end panel 83 in the folded-under position. This panel is hinged to the main plane at 84. A bracket 85 has a cable 86 attached thereto, a pull on the cable swinging the end panel 83 to an extended position (Fig. 15) when the adjacent ends of the main plane and end panel abut, as clearly shown. Although the abutting of these parts will limit the extending movement of the end panel, a double foot 87 is provided nevertheless to insure stabilization of the end panel. The cable 86 is trained over suitable pulleys 88 and leads to a point within convenient reach of the pilot.

A propeller 89, mounted upon a stub shaft 90 on the end panel 83, is entered for swift rotation of its own account when the airplane rotates earthward thus to set up sufficient resistance to the gravitation of the airplane and retard its downward movement. In practice the bracket 85 is so constructed and arranged as not to interfere with the tips of the propeller.

Figs. 16 to 19 illustrate the use of a pilot parachute 97 for insuring the discharge of the main parachute 52. The pilot parachute is attached to an appropriate anchorage 98 on top of the main parachute 52 by means of cords 99. Both parachutes are normally contained by a housing 53 located within the confines of the main plane 3 itself and confined by a trap door 100 which is held closed by a latch 101. The latch is retracted by a cord 102 which runs to a point within reach of the aviator. The trap door has connection with a frame 103 by means of cords 104. A cable 105 connected with the frame permits rocking of the frame upon its hinges 106 when the aviator pulls on the cable, thus opening the trap door 100 and permitting the parachute to come out. The trap door is hinged at 107 to a plate 108.

Figure 19:
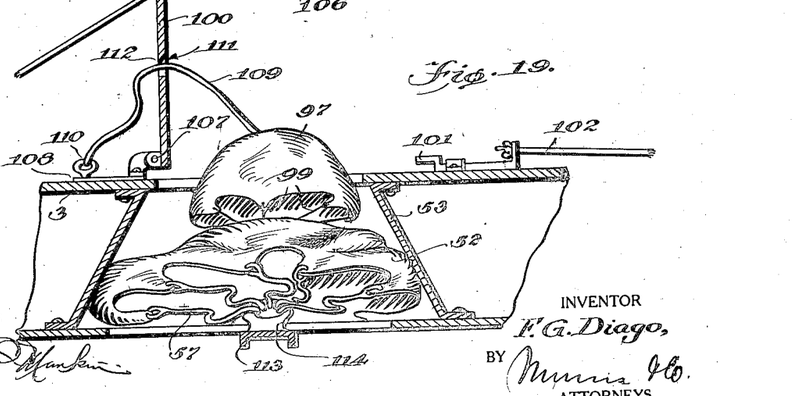
Figure 19 is a detail sectional view illustrating the housing for the foregoing pilot and main parachutes.

The act of opening the trap door causes a raising of the pilot parachute 97 out of position within the housing 53, as shown in Fig. 19. This is accomplished by means of a cord 109 attached at its respective ends to an eyebolt 110 on the plate 108 and to the pilot parachute. The cord is run through an opening 111 in the trap door, the arrangement being such that as the trap door swings to an open position it exerts a pull on the cord by virtue of the binding of the lower edge of the opening against the cord. This binding action is sufficient to lift the pilot parachute out, and when the pilot parachute is once caught by the wind a reversal in position of the cord 109 brings it into contact with the knife edge 112 at the opposite side of the opening so that the cord is cut and the pilot parachute released.

Being once released the pilot parachute will operate to pull the main parachute 52 out of the housing, and this action of the pilot parachute may either be relied upon solely or the bottom of the housing may be furnished with an opening or grating through which the wind may blow as in the instance in Fig. 10. However, in this particular form of the invention, it is desirable to replace the grating by a light but strong channel 113 which has a sufficiently large eye 114 providing a place of connection for the various cords 57 of the main parachute.

Figure 20:
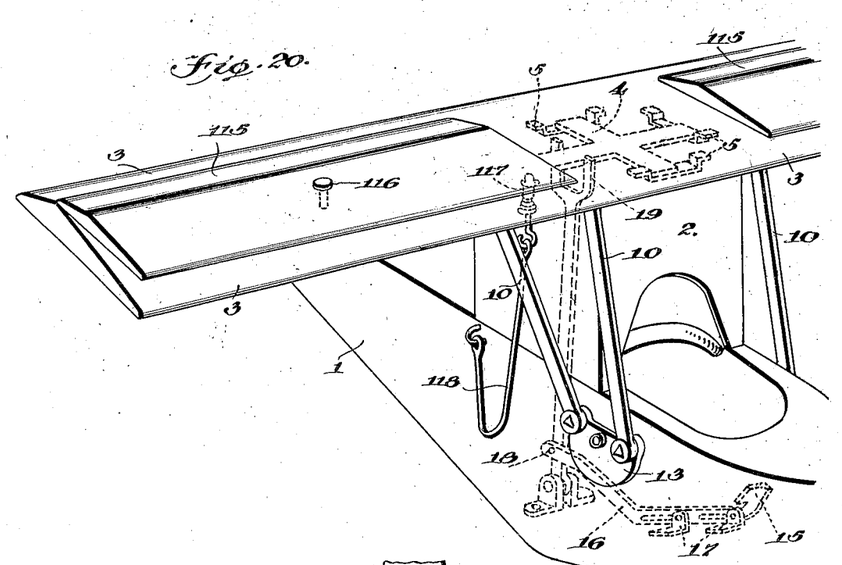
Figure 20 is a perspective view of another modification wherein the main plane is equipped with auxiliary planes for retarding the descent.
Figure 21:
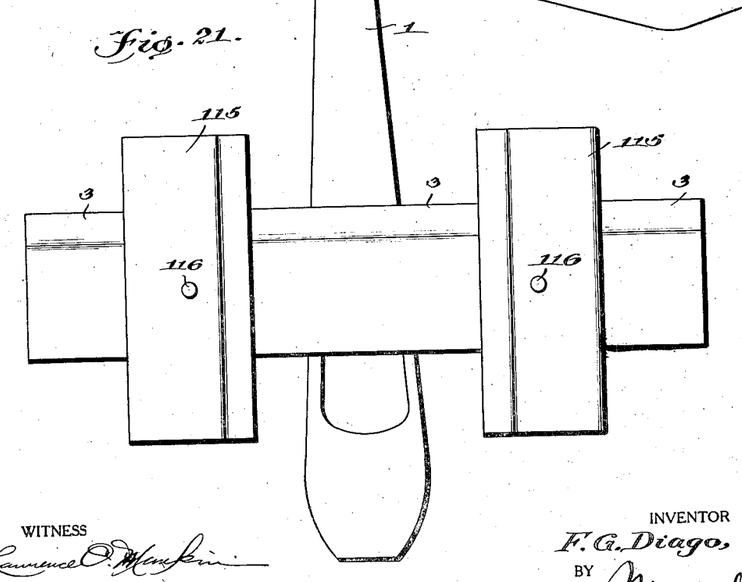
Figure 21 is a detail plan view showing the auxiliary planes positioned crosswise of the main plane for the foregoing purpose.

Figures 20 and 21 illustrate a further modification in which the fall-retarding means comprises auxiliary planes 115 pivotally mounted at 116 on the main plane 3. These auxiliary planes are normally held in line with the main plane by means of spring latches 117. A pull upon the cord 118 of the respective latches will release auxiliary planes 115 in each instance permitting the assumption of a position at right angles to the main frame. The additional surface thus presented tends to retard the downward movement of the airplane, the crosswise or extended positions of the auxiliary planes being shown in Fig. 21.

Figures 22, 23, 24:
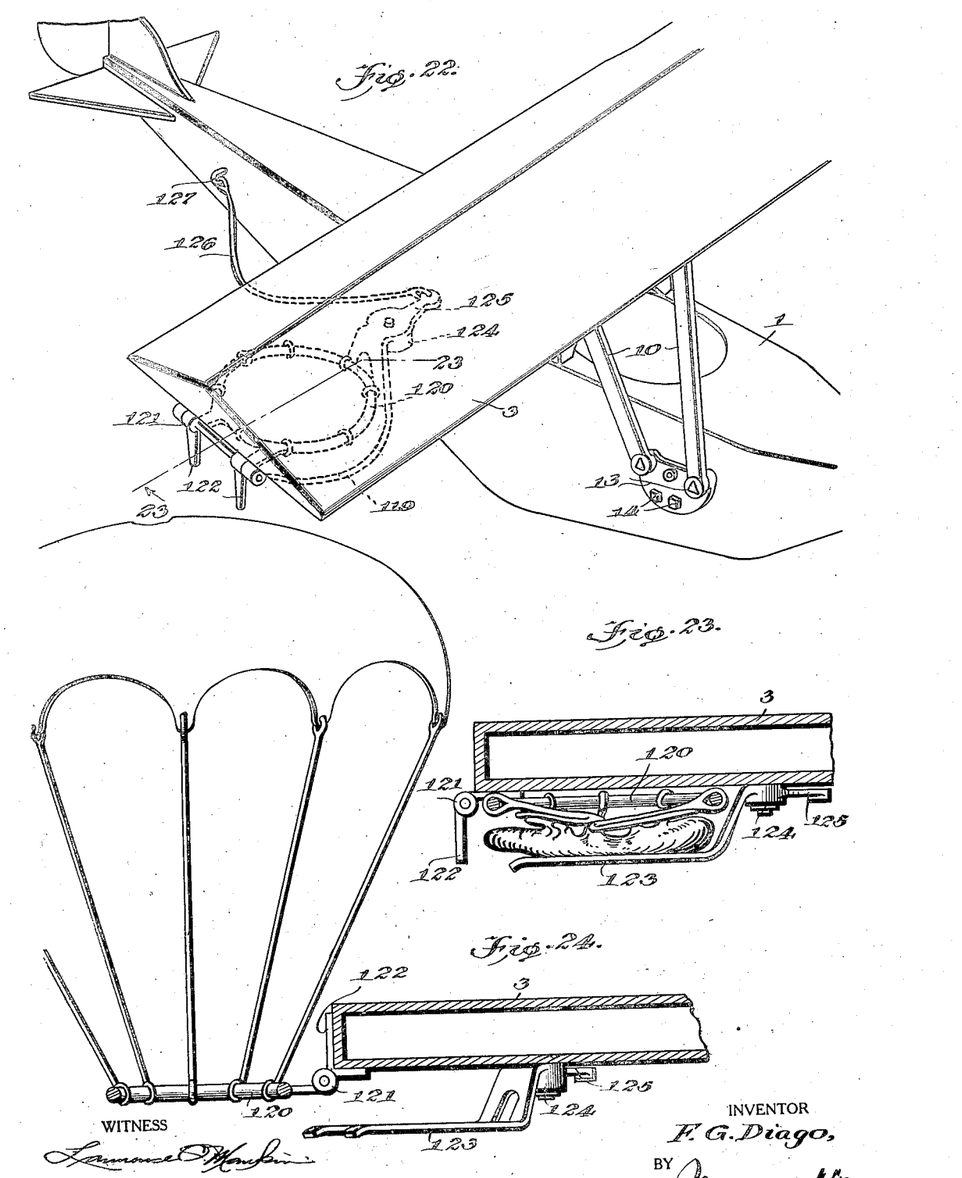
Figure 22 is a detail perspective view of the airplane illustrating a further modification in the mounting of the parachute.
Figure 23 is a detail section taken substantially on the line 23—23 of Fig. 22.
Figure 24 is a detail section showing the base ring released and the parachute extended.

Figures 22, 23 and 24 illustrate a still further modification wherein the parachute 119 is arranged for movement into the operative position much on the order of the extensible end panel 83 in Figs. 14 and 15. The parachute is attached to a base ring 120 which is hinged at 121 and has stop lugs 122 which limit the extending movement of the base ring and hold the latter in position shown in Fig. 24.

Ordinarily the parachute 119 is compactly folded between the base ring and retainer arms 123 which are pivoted at 124 upon the main plane 3 and have an extension 125 to which one end of a cable 126 is connected. The other end of the cable is connected to an eye 127 on the fuselage. There is some slack to the cable as indicated, the purpose of this being to arrive at an automatic release of the parachute at the proper moment.

This moment arrives when the pilot finds it necessary to permit forward movement of the main plane in respect to the fuselage for the purpose of retarding earthward movement. As the main plane moves forwardly, the slack in the cable 126 is taken up so that a pull is exerted upon the extension 125 causing turning thereof to such an extent that the retainer arms 123 are displaced from beneath the parachute. The action of the wind currents is then to swing the base ring 120 around to the position in Fig. 24 and at the same time blow the parachute 119 out to the open position. The means for bringing the main plane forwardly may be either that shown in Fig. 8 or in Fig. 14.

The operation may be readily understood. It has been brought out already that one principle prevails in all of the various modifications disclosed. This principle is to retard the gravitational movement of the airplane whether that be voluntary or otherwise. It is evident that upon occasion to make a landing in a rough country, it is desirable to have the airplane move downwardly as nearly to the vertical direction as may be so that any relatively smooth bit of land may be taken advantage of for the purpose. A landing would be impossible if it required the abnormally long runway of the present time.

Taking first the particular form in Figs. 1 to 8, it is proposed to make possible the free swinging of the main plane 3 in reference to the fuselage 1 so that the latter may adapt itself as may be required in reference to the main plane. Upon release of the main plane the latter swings forwardly and assumes a position substantially at right angles to the assumed vertical line of descent and a position substantially parallel to the earth's surface. It is obvious that if the main plane were permitted to rigidly remain in position as shown in Fig. 3 the benefits of the swinging umbrella-like main plane would not be had and the airplane instead of gravitating readily to the ground would turn turtle and fall headlong to the earth.

Fig. 9 illustrates the use of parachutes to supplement the foregoing retarding action of the main plane. Without repeating the discription of the release of the parachutes, it is evident to the reader that when the parachutes are released and filled with air, they will act efficiently as retarders. The same is true of all other modifications employing parachutes, the principal different concerning such modifications residing in the modes of mounting.

While the construction and arrangement of the improved airplane is that of a generally preferred form, obviously modifications and changes may be made without departing from the spirit of the invention or the scope of the claims.

I claim:—

1. An aircraft comprising a fuselage having a turret, a main plane situated upon the turret and having part of the sustaining surface concealed and covered by the turret, articulated connections between the fuselage and main plane, and means permitting swinging of the main plane upon said connections to displace the main plane from the turret and expose the formerly concealed sustaining surface to the atmosphere thus to retard the gravitational movement of the aircraft.

2. An aircraft comprising a fuselage having a turret, a main plane situated upon the turret which conceals and covers part of the sustaining surface, means to hold the main plane in said position, suspending arms hinged to the main plane and hingedly connected with the fuselage at a point forwardly of the turret, and means for operating said holding means to release the main plane permitting swinging thereof upon said arms away from the turret and into a position forwardly thereof.

3. An aircraft comprising a fuselage having a turret, a main plane situated upon the turret, holding means for normally holding the main plane in said position, suspending arms hinged to the main frame and extending forwardly to a point in advance of the turret, means carried by the fuselage with which said arms are connected, said means being operable to swing the arms and dispose the main plane in a position forwardly of the turret thus to present the previously concealed sustaining surface, and means for operating the holding means to release the main plane prior to said swinging.

4. An aircraft comprising a fuselage having a turret, a main plane situated upon the turret, arms hinged to the fuselage at a point forwardly of the turret, and means carried by the fuselage for normally keeping the main plane in said position upon the turret but permitting forward swinging of the arms and main plane in respect to the turret.

5. An aircraft comprising a fuselage having a turret, a sustaining plane situated upon the fuselage, articulated connection between the plane and fuselage permitting a forward shifting of the plane in respect to the turret thus to expose sustaining surface normally concealed by said turret, a parachute connected with the plane in folded position and at one side thereof, and means for causing automatic release of the parachute upon said forward movement of the plane thus permitting opening thereof.

6. In an aircraft comprising a fuselage having a turret, a sustaining plane situated upon the turret, articulated connections between the plane and fuselage permitting a forward shifting of the plane in respect to the turret and exposure of the sustaining surface formerly concealed by the turret, a base ring hinged to the plane and having stop lugs, a parachute connected with the base ring and normally folded up at one side of the plane, retaining arms pivoted to the plane and holding the parachute in said folded position, and means for automatically rocking the retaining arms to release the parachute and permit swinging of the base ring until the stop lugs limit its swinging when said parachute can open by wind pressure, said means including an extension on the sustaining arms and a slack cord connecting the extension with the fuselage.

7. An aircraft comprising a fuselage having a turret, brackets carried by the turret having a shaft and a hub with a plurality of bolts, a plane situated upon the turret and having keepers engageable by the bolts thus to lock the plane in position upon the turret, articulated connection between the plane and fuselage permitting forward swinging of the plane to expose sustaining surface normally concealed by said turret, and means for rotating the hub and shaft to displace the bolts from the keepers and permit forward swinging of said means comprising a pivoted fork and a connected drag link.

8. An aircraft comprising a fuselage having a turret, a plane situated upon the turret and having suspending arms hinged at one end thereof, plates attached to the fuselage having bearings containing shafts to which the other ends of the arms are connected, cranks carried by said shafts, an operating shaft journaled between plates and having cranks, links providing common connections between the various cranks, a lever on the upper shaft for turning said shaft, and rocking the various cranks to swing the plane either forwardly or backward in respect to the turret, and means for locking the lever in its various adjustments.

9. An aircraft having a wing structure, a collapsed parachute, and instrumentalities for varying the angle of incidence of the wing structure and automatically releasing the parachute upon variation of said angle.

10. An aircraft having a wing structure, a parachute which remains packed so long as the aircraft continues in safe flight, and means for varying the angle of incidence of the wing structure upon the occurrence of trouble in midair, and at the same time to eject the parachute.

11. An aircraft comprising a fuselage, a wing structure, a normally folded parachute, means for swinging the wing structure in respect to the fuselage in order to vary the angle of incidence of the wing structure, and means having connection with the fuselage which, by virtue of said connection will operate to release the parachute when the change in the angle of incidence is effected.

12. An aircraft comprising a fuselage, a connection attached at one end to the fuselage, a wing structure mounted to swing in respect to the fuselage thus to vary the angle of incidence and pull on the connection, and means representing a reserve amount of sustaining area, with which the other end of the connection is associated, being brought into play upon the occurrence of said pull to make available the additional sustaining area.

13. An aircraft comprising a fuselage, a wing structure, and arms attached to the wing structure and having a pivotal mounting on the fuselage upon which they may be swung to expose parts of the wing surface formerly covered by a part of the fuselage.

FEDERICO GUILLERMO DIAGO.